May 15, 1962    W. STIEBER    3,034,365
FRICTION PRODUCING DEVICE FOR TRANSMITTING OR DESTROYING FORCES
Filed Sept. 4, 1958    2 Sheets-Sheet 1

INVENTOR
WILHELM STIEBER
by K. A. Mayr
ATTORNEY.

May 15, 1962 W. STIEBER 3,034,365
FRICTION PRODUCING DEVICE FOR TRANSMITTING OR DESTROYING FORCES
Filed Sept. 4, 1958 2 Sheets-Sheet 2

INVENTOR.
WILHELM STIEBER
by K. A. May
ATTORNEY.

United States Patent Office 3,034,365
Patented May 15, 1962

3,034,365
FRICTION PRODUCING DEVICE FOR TRANSMITTING OR DESTROYING FORCES
Wilhelm Stieber, 20 Spitalstrasse, Weingarten, Wurttemberg, Germany
Filed Sept. 4, 1958, Ser. No. 759,070
5 Claims. (Cl. 74—206)

The present invention relates to a device for producing friction for transmitting or destroying forces.

Conventional devices for producing friction are characterized by surfaces sliding upon one another. The friction coefficient of these devices depends on the temperature and on the lubrication of the surfaces which glide one on the other. The heat generated by friction cannot always be sufficiently dissipated to prevent deterioration of the devices caused by excessive temperatures.

An object of the present invention resides in the provision of friction producing devices which avoid the aforesaid disadvantages of conventional devices. According to the invention rollers are interposed between the friction producing surfaces which rollers are pressed by said surfaces and roll as well as glide on the surfaces upon relative movement of the surfaces. The rollers are guided to move in the direction of movement of the driving surface. The guide, however, is so constructed that the axes of the rollers are inclined to the direction of movement of the driving surface, the angle of the inclination being smaller than 90°. Therefore, the rollers do not only roll but also glide in the direction of their longitudinal axes. The so produced gliding friction between the surface of the rollers and the surface engaged thereby is utilized for transmitting or destroying forces. The shape of the rollers may be cylindrical, conical, ball-like or of any other suitable configuration, depending on the individual requirements. The rollers are preferably guided by a cage or other suitable device. The cage may consist of one or more parts.

The invention relates more particularly to arrangements in which the rollers are arranged in groups of adjacent and parallel rollers and to clutches having conical clutch faces with caged rollers therebetween as well as to clutches in which one of the mating clutch parts forms a cage for the rollers.

The novel features which are considered characteristic of the invention are set forth with particularity in the appended claims. The invention itself, however, and additional objects and advantages thereof will best be understood from the following description of embodiments thereof when read in connection with the accompanying drawing, in which:

Figure 1:
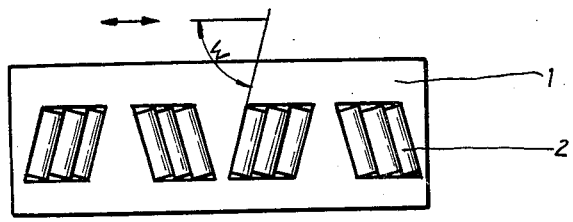
FIG. 1 is a diagrammatic top view of a force transmitting or destroying element according to the invention which moves on a straight line relative to another element which is not shown.

Referring more particularly to FIG. 1 of the drawing, numeral 1 designates a platelike roller cage having four openings, each opening accommodating three rollers 2. The roller cage 1 with the rollers 2 is placed between friction surfaces of elements, not shown, between which a force is to be transmitted. These surfaces are parallel to the platelike cage 1 and are pressed against the rollers by conventional means, not shown. The friction surfaces move relatively to each other in the direction of the arrows shown on top of FIG. 1. The driving surface moves the rollers 2 with their cage 1 in the direction of one of the arrows. The rollers roll thereby on the other surface which may be assumed to be stationary. As seen in FIG. 1 the rotation axes of the rollers are placed at an angle $w$ relatively to the direction of movement of the driving surface. The inclination of the axes of one group of rollers may be clockwise and the inclination of another group may be counterclockwise. Due to their inclined position, the rollers do not only perform a rolling movement but also a sliding movement so that sliding friction is produced between the circumferential surface of the rollers and the frictional surfaces between which the rollers operate. This causes movement of the second frictional surface in the direction of the movement of the first or driving surface and a power transmission from the first surface to the second surface. The component of the sliding movement depends on the angle which is formed by the axes of the rollers and the direction of movement of the roller cage. The component of the rolling movement corresponds approximately to the sine of this angle and the component of the sliding movement corresponds approximately to the cosine of this angle. By suitable choice of the inclination of the axes of the rollers with respect to the direction of the movement of the roller cage the relation between the rolling and sliding movements can be predetermined.

The rollers of each group frictionally engage each other whereby the force destroying and transmitting effect is enhanced.

Figure 7:
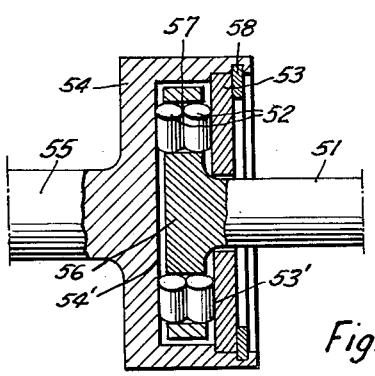
FIG. 7 is a diametrical sectional view of a further modification of a torque transmitting device according to the invention.

In the embodiment illustrated in FIG. 1 the longitudinal axes of the rollers 2 are situated in planes which are parallel to the surfaces of the roller cage 1. The later may be made so thick and the apertures may be so shaped that a plurality of rollers can be so arranged that their rotation axes are in planes which are at a right angle to the plane of the cage 1. This modification is illustrated in FIG. 7 as applied to a device for transmitting torque.

Figure 2:
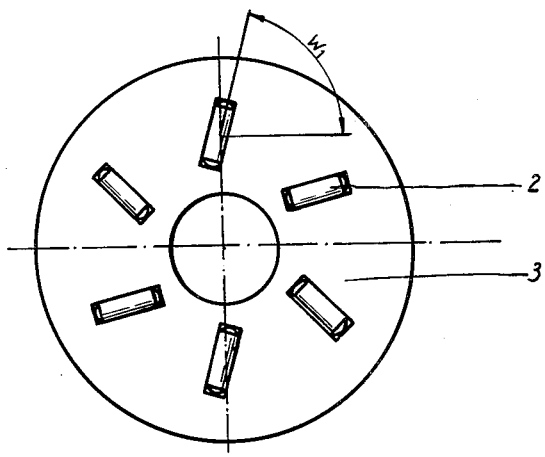
FIG. 2 is a diagrammatic top view of an element according to the invention for transmitting torque.

FIG. 2 illustrates a device for transmitting torque. The apparatus includes a rolled cage 3 having six rectangular apertures, each aperture accommodating one roller 2. The inclination of the long axes of the rectangular apertures with respect to the radii on which the apertures are located is the same for all apertures, i.e., the angles $w_1$ formed by the rotation axes of the rollers 2 and a tangent on a circle defining the path of the rollers are equal. The roller cage 3 is rotated in the same direction in which the torque is transmitted. The roller cage with the rollers is disposed between the surface of a driving element and the surface of a driven element which elements are not shown and are guided to rotate coaxially of the roller cage 3.

Figure 3:
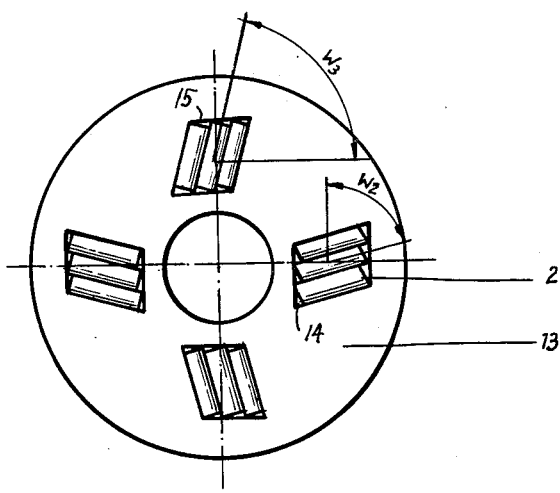
FIG. 3 is a diagrammatic top view of a modification of the element shown in FIG. 2.

FIG. 3 illustrates a modification of the device shown in FIG. 2. The apertures in a roller cage 13 are so shaped as to individually accommodate three rollers 2 whereby the angles formed by the axes of the rollers and the direction of circumferential movement of the rollers is different in different apertures. For example, the angle $w_2$ formed by the rollers in the aperture 14 and the direction of movement of the rollers is smaller than the angle $w_3$ formed by the rotation axes of the rollers in the aperture 15 and the direction of movement of the rollers.

Figure 4:
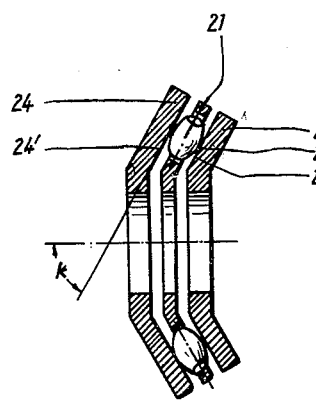
FIG. 4 is a diametrical sectional view of a modification of the torque transmitting device shown in FIG. 2.
Figure 5:
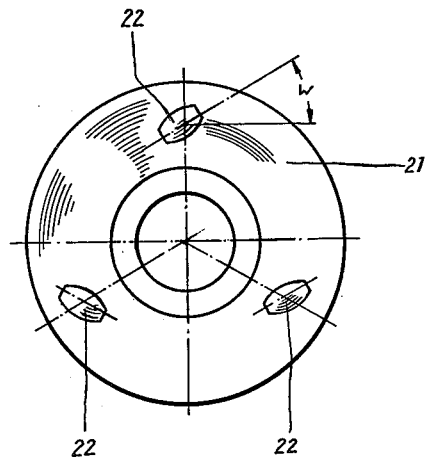
FIG. 5 is a plan view of the roller cage and rollers of the torque transmitting device shown in FIG. 4.

In the modified torque transmitting device shown in FIGS. 4 and 5 the cage 21 holding the rollers 22 and the friction surfaces 23' and 24' of the adjacent elements 23 and 24 have a conical shape. The surfaces 23' and 24' are parallel to the cage 21 and pressed, by means not shown, against the rollers 22, which are barrel shaped. The angle *k* formed by the conical surfaces 23' and 24' with the rotation axis of the device is always larger than the angle of friction and normally greater than 40 degrees.

The size of the angle *w* shown in FIGS. 1, 2, 3 and 5 ranges generally between 20 and 70 degrees.

Figure 6:
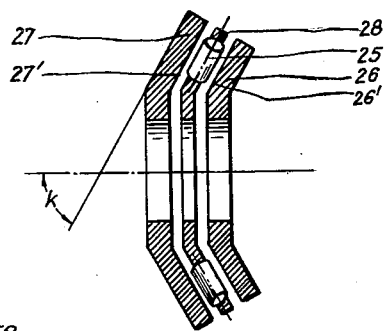
FIG. 6 is a diametrical sectional view of a modification of the torque transmitting device shown in FIGS. 4 and 5.

In the modification illustrated in FIG. 6 the rollers 25 are in the form of needle rollers. They are guided by a cage 28 having a conical shape and being located between similarly shaped surfaces 26' and 27' of elements 26 and 27. Because of their small diameter, the needle rollers are capable of being bent by the increasing pressure of the coneshaped surfaces 26' and 27' of the elements 26 and 27 till they closely engage these surfaces. In this case the friction force increases smoothly and without knocking.

FIG. 7 illustrates a device having a roller cage 56 formed by a flange at the end of a driving shaft 51. The flange is of sufficient thickness to accommodate two adjacent parallel rollers 52 in suitable apertures 57 in the disc or flange 56. The apertures 57 may be shaped in the same manner as the apertures in the roller cages shown in FIG. 2 or in FIG. 3. The axes of the two rollers in the same opening are located in a plane which is parallel to the rotation axis of the device. Whereas in FIG. 3 the axes of the rollers are in a plane which is parallel to the planes of the friction surfaces, the axes of the rollers 52, which are in the same aperture, of the embodiment shown in FIG. 7 are in a plane which is normal to the planes of the friction surfaces 53' and 54' of parts 53 and 54. The surface 54' is on a flange 54 at the end of a driven shaft 55. The surface 53' is on one side of an annular member 53 which is axially movable in a cylindrical extension of the flange 54 which extension accommodates the flange 56. The element 53 is pressed against the surface 54' by a resilient means 58 generally shown as a rubber ring. There is a rolling friction between the rollers 52 and the surfaces 53' and 54'. Since the axes of the rollers are inclined to the respective radii of the flange 56 on which the apertures 57 are located there is also sliding friction which tends to take along the members 53 and 54 upon rotation of the drive shaft 51.

The forces and moments transmitted by the devices shown in FIGS. 1 to 7 are proportional to the pressures P. If conventional devices are provided for changing or releasing these pressures the transmitted forces or moments are changed or released accordingly.

The devices according to the invention may be used individually or may be arranged in pairs or greater numbers in the manner as used in conventional lamellar clutches whereby the transmitted force or torque is increased.

Aside from the aforedescribed characteristics the friction element according to the invention has the following advantages:

The movement of the rollers which is the resultant of a rolling and of a sliding movement, relatively to the friction surfaces on which the rollers roll and slide, has a lapping effect whereby the friction surfaces are continuously improved and wear is reduced or entirely avoided.

By using suitable material, for example, hardened steel, the composite movement of the rollers affords transmission of forces which forces are a multiple of the forces which can be transmitted by a conventional clutch of similar dimensions.

Because of the rotation of the rollers the periods during which the frictional surfaces are in engagement are brief. The period of time available for cooling each frictional surface portion is more than hundredfold the time during which the surface portion is heated while it transmits a force. The frictional surfaces are out of engagement more than 99% of the operating time of the device. It is, therefore, easily possible to effect a continuous cooling of the frictional surfaces and a very efficient removal of frictional heat by conventional cooling means which pass a liquid or gaseous coolant between the rollers and the surfaces engaged by the rollers. Due to the lapping effect and the possibility of a highly efficient heat removal directly from the engaged surfaces, the clutch may slide for a considerable period of time at full torque without adverse effect. Because there is only linear engagement and no engagement of broad surfaces, formation of an oil film as in conventional lubricated friction clutches is not possible. Therefore, the changeover from relative movement of the force or torque transmitting elements to relative standstill is steady and without shock. The friction coefficient of the device according to the invention is substantially independent of lubrication and quality of lubricants.

In view of the aforesaid advantages the apparatus according to the invention is particularly well adapted for use in adjustable clutches, for use in sliding clutches, for overload protective devices, in devices for damping vibrations, in shock absorbers and brakes, and also in testing apparatus for determining friction coefficients.

I claim:

1. A torque transmitting device comprising a driving element and a driven element, said elements being rotatable on a common rotation axis and having opposed coaxial cone-shaped surfaces whose axes coincide with the rotation axis of said elements and form an angle of at least 40° with said axis, rollers interposed between said surfaces, and guide means for said rollers including means for positioning the rotation axes of said rollers at an angle relatively to the radii extending from the rotation axis of the device to said rollers which angle is smaller than 90° for producing friction between said rollers and said surfaces in the direction of the longitudinal axes of the rollers.

2. A friction device comprising a rotatable driving element, a rotatable driven element placed coaxially of said driving element, one of said elements having two axially spaced radial surfaces, and rollers interposed between said surfaces, the other of said elements having a portion interposed between said surfaces and forming a cage for said rollers, said portion including means for positioning the rotation axes of said rollers at an angle relatively to the radii extending from the rotation axis of the device to said rollers which angle is smaller than 90° for producing friction between said rollers and said surfaces in the direction of the longitudinal axes of the rollers.

3. A friction producing device for transmitting or destroying forces, comprising a driving element and a driven element, said elements having opposed surfaces, rollers interposed between said surfaces, and guide means for said rollers including means for positioning the rotation axes of said rollers at an angle relatively to the direction of movement of said driving element which angle is smaller than 90° for guiding the rollers to roll around their longitudinal axes and to simultaneously glide relatively to said surfaces in the direction of the longitudinal axes of the rollers, said rollers being arranged in a plane which is parallel to said surfaces and in groups with the rollers of each group placed parallel to and frictionally engaging each other.

4. A friction device comprising a driving disc and a driven disc, said discs being placed in coaxial relation and having opposed surfaces, oblong rollers interposed between said surfaces, and a disc-like cage coaxially interposed between said discs and including means for positioning the rotation axes of said rollers generally radially of the device and at a slant to the direction of movement of said driving disc for guiding the rollers to roll around their longitudinal axes and to simultaneously glide relatively to said surfaces in the direction of the longitudinal axes of the rollers.

5. A friction device as defined in claim 4 wherein said cage is in the form of a plate having apertures receiving and fitting said rollers.

References Cited in the file of this patent

UNITED STATES PATENTS

| | | |
|---|---|---|
| 970,995 | Dill | Sept. 20, 1910 |
| 1,141,508 | Weiss | June 1, 1915 |
| 1,410,722 | Rogers | Mar. 28, 1922 |
| 1,540,737 | Connet | June 2, 1925 |
| 1,955,879 | Griswold | Apr. 24, 1934 |
| 2,163,066 | Searcy | June 20, 1939 |
| 2,490,525 | Koller | Dec. 6, 1949 |